United States Patent [19]

Elizondo et al.

[11] Patent Number: 5,245,916
[45] Date of Patent: Sep. 21, 1993

[54] CARTRIDGE-CARRIER FOR PLASTIC CONTAINERS IN CONTINUOUS OR ROTARY ORBITAL STERILIZERS

[75] Inventors: Rey A. Elizondo; Terry L. Heyliger, both of San Jose; Joost Veltman, Aptos, all of Calif.

[73] Assignee: FMC Corporation, Chicago, Ill.

[21] Appl. No.: 737,816

[22] Filed: Jul. 29, 1991

Related U.S. Application Data

[63] Continuation of Ser. No. 520,939, May 9, 1990, abandoned.

[51] Int. Cl.⁵ .............................................. A23L 3/06
[52] U.S. Cl. ........................................ 99/359; 99/365; 220/4.22; 220/4.24; 422/25; 422/26; 422/302; 422/304
[58] Field of Search ...................... 99/359-361, 99/365, 366, 369, 371, 426, 427, 443 C, 467, 477, 478; 220/4.22-4.24, 737; 269/287; 422/25, 26, 38, 104, 302, 304; 426/405-407, 401, 412

[56] References Cited

U.S. PATENT DOCUMENTS

| | | | |
|---|---|---|---|
| 363,941 | 5/1887 | Ashby | 426/407 |
| 369,424 | 9/1887 | Baker | 99/360 |
| 677,162 | 6/1901 | Winters | 99/360 |
| 1,510,544 | 10/1924 | Chapman | 99/361 |
| 1,732,589 | 10/1929 | Plummer | 99/369 |
| 2,798,784 | 7/1957 | Marshall | 220/4.22 |
| 3,314,560 | 4/1967 | Bell | 99/360 X |
| 3,347,154 | 10/1967 | Pech | 99/359 |
| 3,388,528 | 6/1968 | Croall et al. | 198/418.1 X |
| 3,511,168 | 5/1970 | Pech | 99/360 |
| 3,544,341 | 12/1970 | Reimers . | |
| 3,606,995 | 9/1971 | van den Hemmel | 99/361 X |
| 3,762,934 | 10/1973 | Reimers . | |
| 4,369,355 | 1/1983 | Helixon | 422/38 X |
| 4,385,035 | 5/1983 | Akitoshi et al. | 99/361 X |
| 4,541,528 | 9/1985 | Holmes | 220/4.23 |

FOREIGN PATENT DOCUMENTS

| | | | |
|---|---|---|---|
| 674876 | 4/1939 | Fed. Rep. of Germany | 99/369 |
| 129805 | 3/1879 | France | 99/369 |
| 682253 | 2/1965 | Italy | 422/302 |
| 78199 | 6/1955 | Netherlands | 99/360 |

OTHER PUBLICATIONS

A Brochure entitled "Orbital Rotary Pressure Sterilizers" (date unknown).

*Primary Examiner*—Harvey C. Hornsby
*Assistant Examiner*—Mark Spisich
*Attorney, Agent, or Firm*—A. J. Moore; R. C. Kamp; R. B. Megley

[57] ABSTRACT

A cartridge-carrier is disclosed for maintaining at least one filled and sealed, plastic container within at least two segments which are joined together to define a tubular cartridge having at least one container supporting plate therein for receiving a body of said at least one sealed container and thereafter closing at least the two segments for encompassing at least one container within a tubular cartridge which is then moved into a cylindrical carrier that enables the containers to be processed within a reel and spiral sterilization system.

19 Claims, 7 Drawing Sheets

FIG_1

PRIOR ART

FIG_2

PRIOR ART
(NON-AGITATING REEL)

FIG_3

PRIOR ART
(AGITATING REEL)

CARTRIDGE-CARRIER FOR PLASTIC CONTAINERS IN CONTINUOUS OR ROTARY ORBITAL STERILIZERS

This application is a continuation of U.S. application Ser. No. 07/520,939, filed May 9, 1990, abandoned.

CROSS-REFERENCE TO RELATED APPLICATION

The present invention is related to Wijts U.S. application Ser. No. 70-520,940, abandoned, entitled Rotary Sterilizer For Plastic Containers, which application is filed on even date herewith and is presently assigned to the Assignee of the present invention.

BACKGROUND OF THE INVENTION

1. Field of the Invention

The present invention relates to sterilization method and apparatus and more particularly relates to cartridge-carriers for supporting containers, such as semi-rigid containers, having food or other products to be sterilized therein when within continuous sterilizing systems including conventional reel and spiral cookers and coolers as well as when within orbital sterilizer systems.

2. Description of the Prior Art

Agitating and non-agitating reel and spiral sterilizing systems which receive cylindrical containers within cartridges and carriers for preventing damage to glass containers or the like when moving through a sterilizing system are well known in the art. Assignee's Bell Patent No. 3,314,560 discloses a method and apparatus for unloading articles such as glass jars from encapsulation within a two-piece telescoping capsule which has moved through a reel and spiral sterilizing system.

Assignee's Croall et al U.S. Pat. No. 3,388,528 is similar to the Bell patent but different in that it discloses an apparatus for encapsulating and loading cylindrical glass containers within capsules.

Assignee's Peck Patent No. 3,511,168 discloses conventional reel and spiral processing systems which may be agitating, or non-agitating systems that progressively move encapsulated containers, such as glass jars, through the processing system.

Orbital rotary sterilizers are well known in the art and are disclosed in Assignee's Reimers Patent No. 3,544,341 and include a housing having a reel and spiral therein but differ from conventional reel and spiral sterilizers in that the spiral is stationary when it is desired to receive containers, advance the containers longitudinally of the axis of the reel, and thereafter discharge the containers from the housing. However, after first filling the housing with a batch of containers, the spiral is detached from the housing and is attached to the reel thereby allowing the containers to be rotated about the axis of the sterilizer for agitating the product therein while being cooked, sterilized and thereafter cooled.

SUMMARY OF THE INVENTION

The cartridge-carriers of the present invention are intended for use in agitating or non-agitating reel and spiral sterilizing systems, or in orbital rotary sterilizers, each of which receives a cartridge-carrier having one or more plastic containers filled with a product to be sterilized therein. A first embodiment of the invention discloses a cartridge formed from two half-cylinders hinged together having a container supporting plate in each half-cylinder with an opening therein which conforms to the shape of a container being supported therein with the periphery of the top of the container being supported on the associated plates. A tray spacer is preferably pivotally supported about the axis of the hinge and cooperates with flanged hinges to prevent movement or bouncing of the containers. The filled cartridge is then fed into a conventional reel and spiral sterilizing system or an orbital rotary sterilizer, for sterilization and subsequent cooling, with or without a carrier.

Prior to describing the present invention it is believed that it would be helpful in understanding the invention to describe the problems to be solved.

Since the modern food canning industry was established, metal cans and glass jars have been the dominant containers for thermally processed, shelf-stable food products. However, as interest in microwaveable containers among food customers grows, our food processors are increasingly more interested in processing shelf-stable food products in different types of retortable plastic containers such as "lunch buckets" and trays with metal, plastic or foil type lids.

Food processors have a wide choice of retort systems that provide batch or continuous processing, with or without agitation of the containers. The selection of a retort system for processing plastic containers is far more complex than that of rigid metal containers. Due to "irregular" and non-cylindrical nature of most plastic containers, these containers are normally handled or loaded in batches in cars that transfer and move them through sterilizing systems continuously or in batches. Most of the batch retorts available in the market have the capability to rotate the cars while inside the retort to provide an end-over-end agitation. This type of agitation results in uneven agitation between the center and outside containers inside the car.

For a more even agitation and continuous operation, the prior art rotary continuous sterilizing systems offer the advantage of uninterrupted flow of containers through the system as well as uniform agitation. As the containers move through the sterilizer, each container is agitated uniformly during the cook and cool cycle. However, this type of sterilizer is designed to handle cylindrical containers and, therefore, the container types that can be processed are limited.

For viscous food products in which induced convection heating into the product is required for high temperature, short time process and higher quality product, the orbital rotary sterilizer may be the preferred method of sterilization. Similarly, this type of sterilizer is designed primarily to handle cylindrical institutional sized containers.

Figure 1:
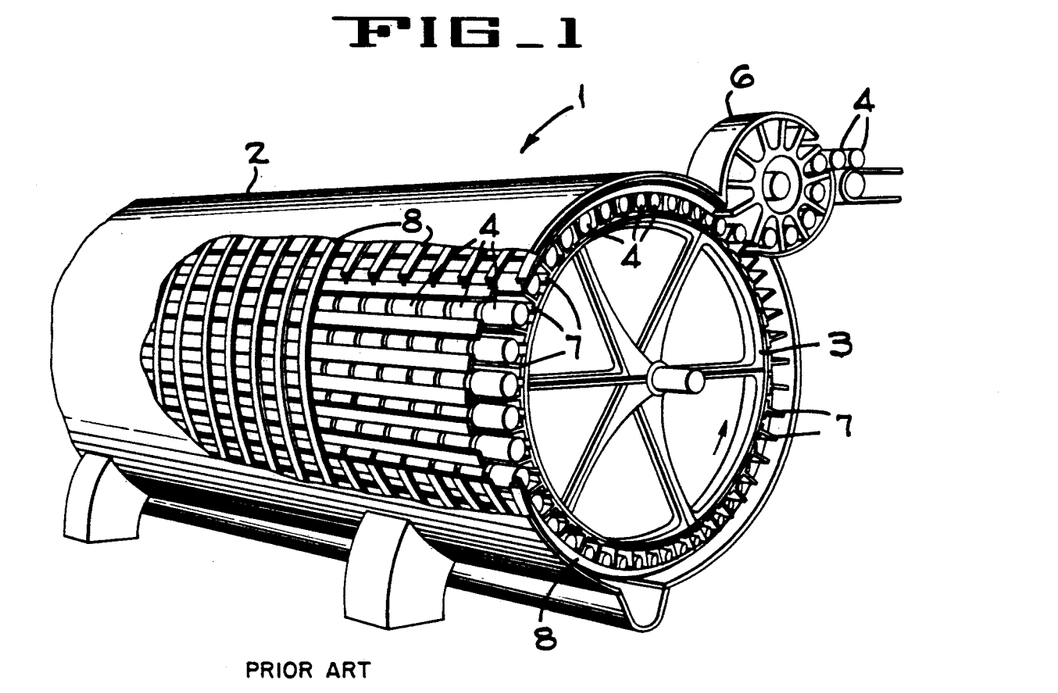
FIG. 1 is a perspective with parts cut away of a prior art unit of a conventional reel and spiral sterilization system.
Figure 3:
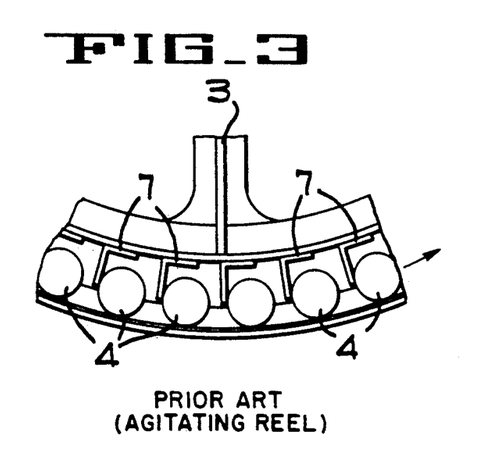
FIG. 3 is a fragment of the lower portion of a conventional agitating reel and spiral sterilizing apparatus.

A prior art continuous rotary heat treatment apparatus such as a sterilizer 1 is illustrated in FIG. 1 and includes a cylindrical housing 2 having a rotatable reel 3 therein which is journaled in end plates (not shown) that are secured to the housing 2 in pressure tight engagement. Cylindrical glass containers are encapsulated within cartridge-carriers 4 and are fed into the rotary sterilizer by a rotary pressure feed valve 6. The cartridge-carriers are received by angle bars 7 (FIGS. 1 and 3) if it is desired to agitate the contents of the containers by causing the containers to roll when moving on the bottom portion of the cylindrical housing 2. The angle bars 7 extend parallel to the axis of rotation of the reel 3, causing the cartridge-carriers 4 and containers therein to contact a T-shaped spiral 8 secured to the housing 2 and move longitudinally of the sterilizers into and through a rotary discharge valve (not shown) at the rear of the sterilizer.

Figure 2:
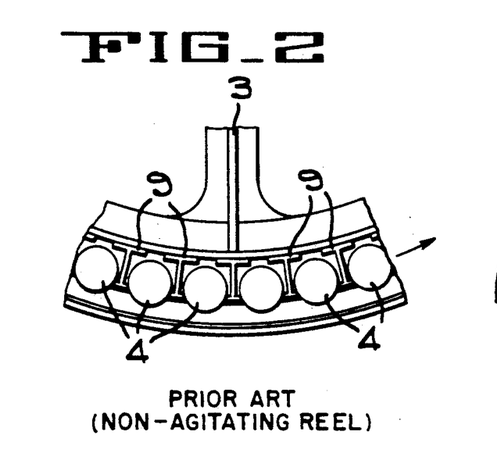
FIG. 2 is a fragment of the lower portion of a conventional non-agitating reel and spiral sterilizing system.

If agitation of the containers is not desired, T-shaped bars 9 (FIG. 2) are substituted for the angle bars 7 thereby preventing containers from rolling when in the lower half of the sterilizer 1.

Although only a portion of one reel and spiral sterilizing system has been illustrated in FIG. 1, it will be understood that in practice, prior art reel and spiral sterilization systems usually include at least one reel and spiral preheater, one reel and spiral sterilizer, and one reel and spiral cooler, all interconnected so that the containers are gradually raised to the desired sterilizing temperature and thereafter gradually cooled thereby controlling the internal pressure within the containers during processing thus preventing excessive expansion and breakage of the container seals.

DESCRIPTION OF THE PREFERRED EMBODIMENT

Figure 4:
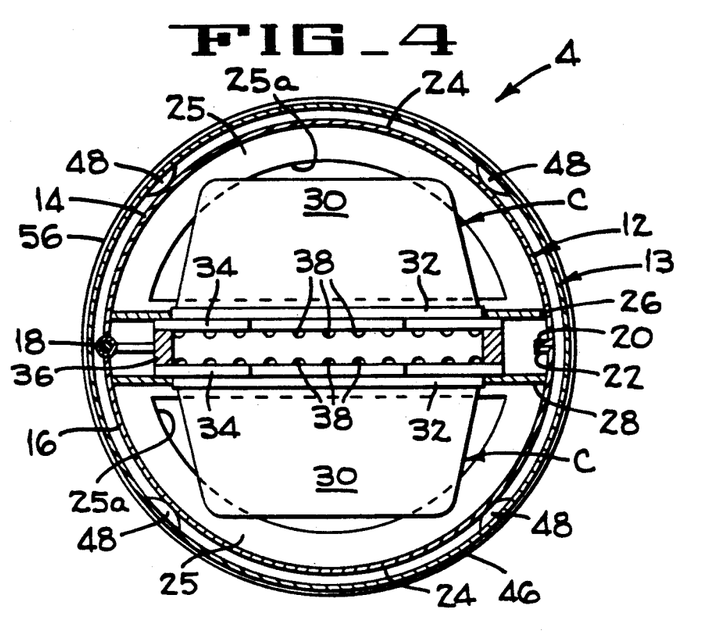
FIG. 4 is a transverse section through a cartridge and carrier illustrating a spacer ring of the first embodiment of the invention with two containers therein being illustrated in full lines.

The first embodiment of the cartridge-carrier 4 (FIGS. 1 and 6) of the present invention comprises a cartridge 12 (FIGS. 4–6) and a carrier 13. The cartridge 12 is formed from two half-cylinders 14 and 16 connected together by a hinge 18. Flanges 20 and 22 are formed on the free edges of the two half cylinders 14, 16, respectively, which flanges act as stops to provide a cylindrical outer surface 24 when the cartridge-carrier 10 is closed as illustrated in FIGS. 4 and 6. Both ends of each cartridge 12 includes an end plate 25 secured thereto with a large opening 25a therein.

Container supporting plates 26 and 28 are rigidly secured to the half cylinders 14, 16, respectively, and have openings 29 (FIG. 6) therein for receiving the bodies 30 of the containers C which are retortable plastic containers with flanges 32, plastic or foil type lids or covers 34 (FIG. 6). The outer edges of the container bodies and the outer edges of covers 34 are larger than the openings 29 (FIG. 5) for maintaining the container body within the openings 29.

Figure 5:
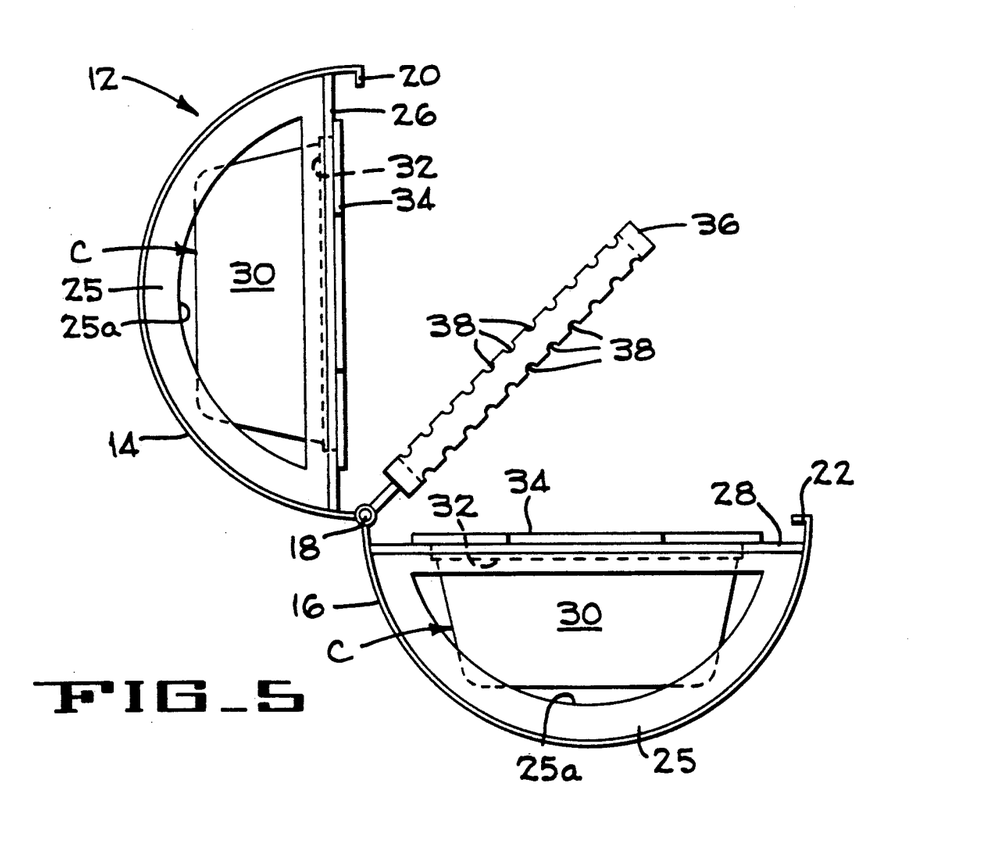
FIG. 5 is an end elevation of the cartridge of FIG. 4 illustrating the two half cylinders in half open position and with the tray spacer being pivoted to an intermediate position.
Figure 6:
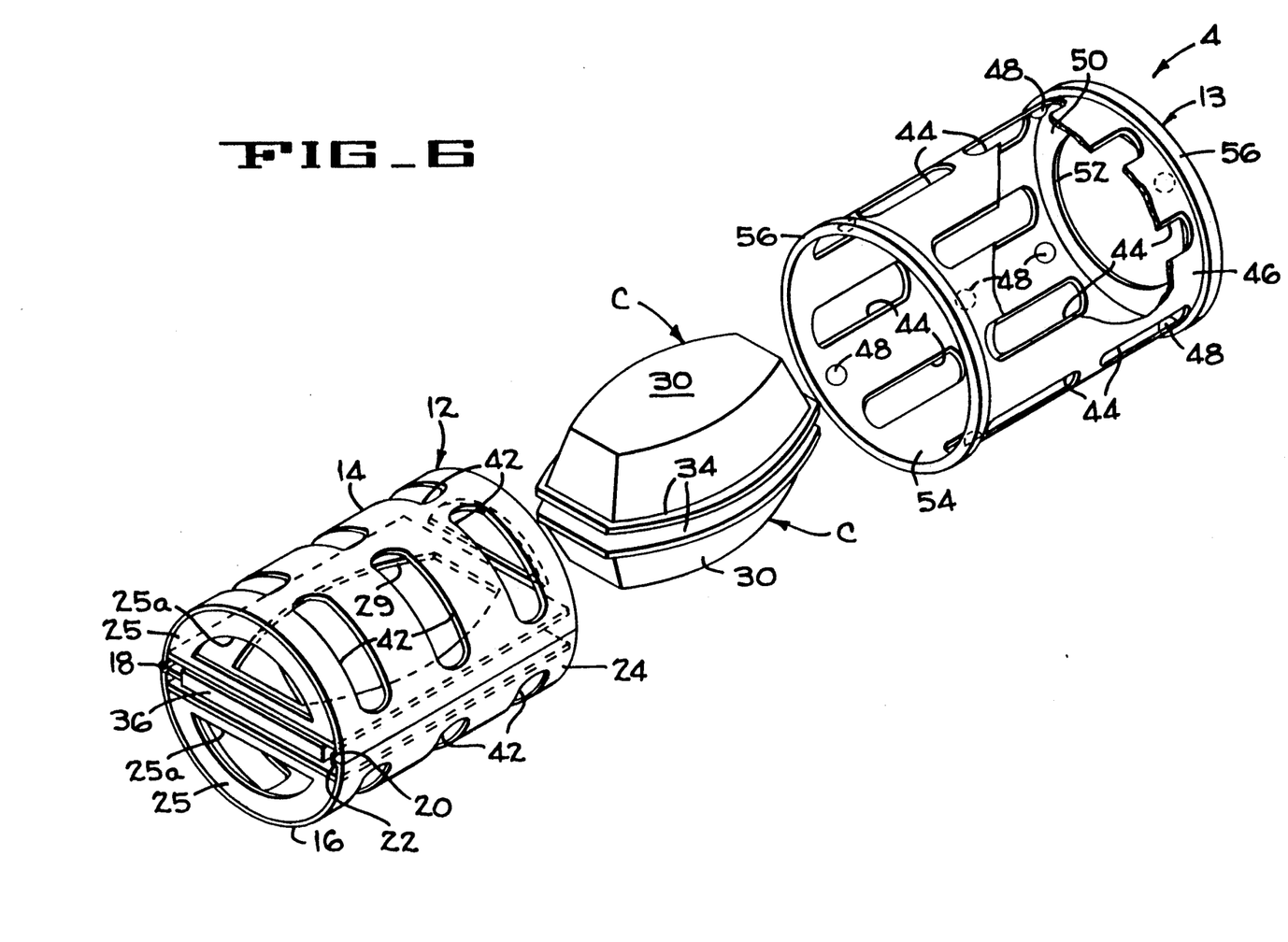
FIG. 6 is a perspective illustrating an empty cartridge in closed position, two containers, one above the other, and a carrier spaced from each other.

As best shown in FIGS. 4 and 5, a tray spacer 36 is pivotally connected to the hinge 18 and has an annular shape which conforms to the shape of the outer edges of the covers 34 of the two containers C within the cartridge for clamping the covers together when the cartridge 12 is closed as shown in FIG. 4. The edges of the tray spacers 36 are preferably provided with notches 38 (FIGS. 4 and 5) for allowing the processing mediums, which may be steam, a steam-air mixture, or water with overriding air pressure to more effectively sterilize and thereafter cool the containers C. The outer cylindrical surface of the cartridges 12 and associated carriers 13 are also preferably provided with elongated slotted openings 42 and 44, respectively, that are perpendicular to each other, for allowing the processing medium to freely flow past the containers C. Since the openings 42, 44, are perpendicular to each other, the danger of the openings being blocked by the cylindrical surfaces of the cartridges and carriers is avoided.

After the containers C have been loaded into the cartridge 12 and the cartridge has been closed to clamp the container C therein, the filled cartridge is then inserted axially within one of the cylindrical carriers 13 (FIGS. 4 and 6).

Each carrier 13 includes a cylindrical wall 46 which has indentations 48 (FIG. 4) therein for slidably accepting cartridges 12 with the containers C loaded therein. Each cartridge also includes arcuate end plates 50 having a large central openings 52 therein.

The central openings 52, and slot openings 42 in the cartridge 12 cooperate with the slotted openings 44 and an end opening 54 and the central opening 52 in the carrier 13 to assure adequate contact of the heat treatment medium with the contents of the plastic containers being processed by allowing the desired amount of circulation of the processing fluids past the containers.

In order to prolong the life of the carrier 13, metal rings 56 are formed or secured to the ends of the carriers so that only the rings 56 of the carriers engage the spiral 8 and angle bars 7, or T-shaped bars 9, (FIGS. 1-3), of the reel and spiral sterilizing system.

In operation of the first embodiment, a plurality of containers C are loaded into cartridges 12 as shown in FIG. 5 and the cartridge is then closed to lock the containers therein as illustrated in FIG. 4. The containers C, when encapsulated within the cartridge 12, are then moved as a unit into the carrier 13 as shown in FIG. 4, and as diagrammatically illustrated in FIG. 6 but with the container C clamped within the cartridge 12 and the cartridge and containers being moved axially into the carriers 13.

The filled cartridge 12 may be moved into the carriers 13 by a prior art encapsulating and loading apparatus of the type disclosed in Assignee's cross-referenced Croall et al U.S. Pat. No. 3,388,528. The filled cartridge-carriers 4 are then fed into a continuous rotary sterilizing system 1 (only a portion of the system being illustrated in FIG. 1). The sterilizing system 1 preferably includes at least a rotary preheater, rotary sterilizer, and a rotary cooler which preheats, sterilizes and cools the containers and contents therein to an outside temperature below that which will cause damage to the containers when returned to atmospheric pressure.

A second embodiment of the cartridge-carriers 4b of the present invention is illustrated in FIGS. 7-10. Since the second embodiment of the invention is quite similar to that of the first embodiment, components of the second embodiment which are equivalent to those of the first embodiment will be assigned the same numerals used in the first embodiment followed by the letter "b".

The second embodiment includes the cartridge-carrier 4b (FIGS. 7 and 10) which include a cartridge 12b formed by two half-cylinders 14b and 16b connected together by hinge 18b and having flanged ends 20b and 22b. A pair of end plates 25b, with openings therein serve to stiffen the cartridge 12b. A pair of container supporting plates 26b and 28b have openings therein for receiving the flange container bodies 30b with container flanges and peripheries of their covers 34b (FIG. 7) being too large to pass through the container supporting openings 29b.

It will be noted that the tray spacers 36 (FIG. 5) of the first embodiment of the invention are not used in the second embodiment. The second embodiment also provides a plurality of openings 42b (FIG. 9) in the cartridge 12b and slotted openings 44b in the carriers 13b which provide for more efficient passage of the heat treatment medium past the encapsulated container bodies 30b and covers 34b when encapsulated within the cartridge-carriers 4b as illustrated in FIG. 10 at the far right.

Figure 7:
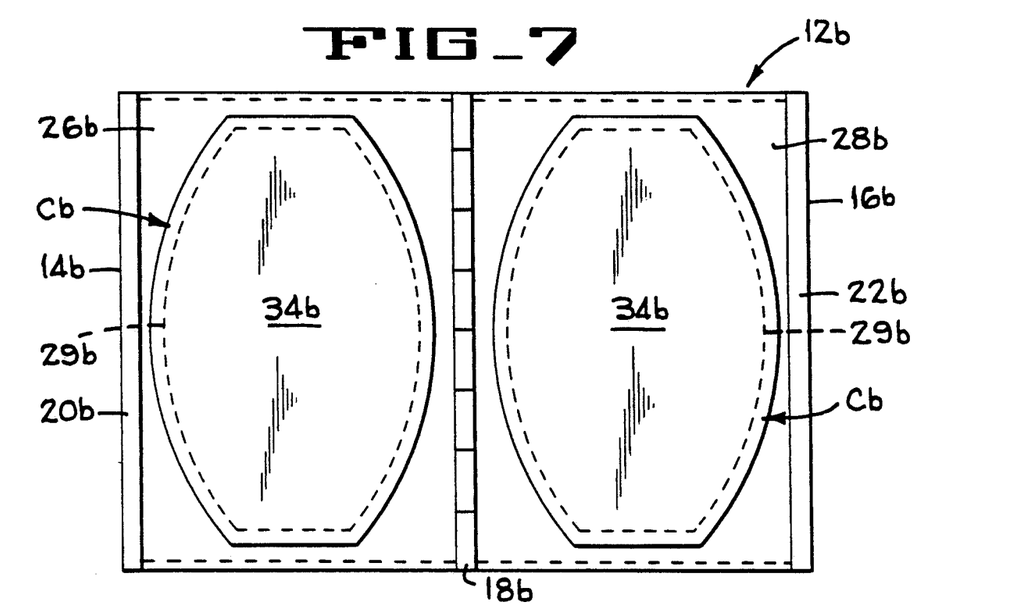
FIG. 7 is a plan view of a second embodiment of the cartridge in fully open position with two containers therein but without a spacer ring.
Figure 8:
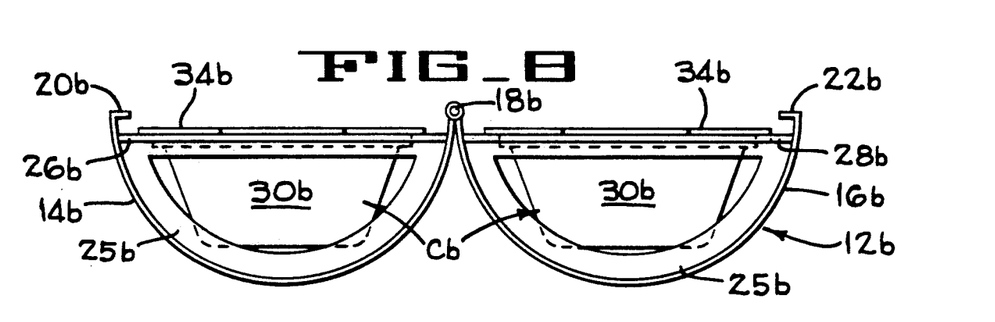
FIG. 8 is an open end view of the cartridge of FIG. 7.
Figure 9:
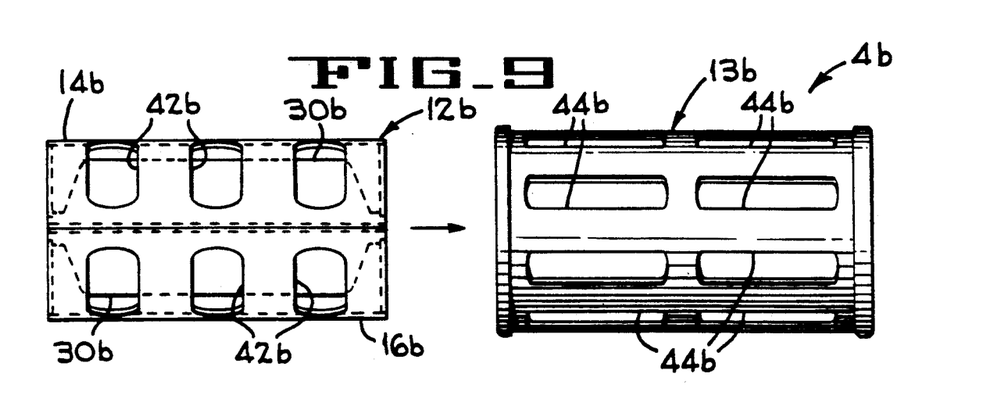
FIG. 9 illustrates the cartridge of FIG. 7 having a plurality of elongated arcuate openings therein, and a carrier having axially elongated openings therein for providing improved circulation of the heating and cooling mediums.
Figure 10:
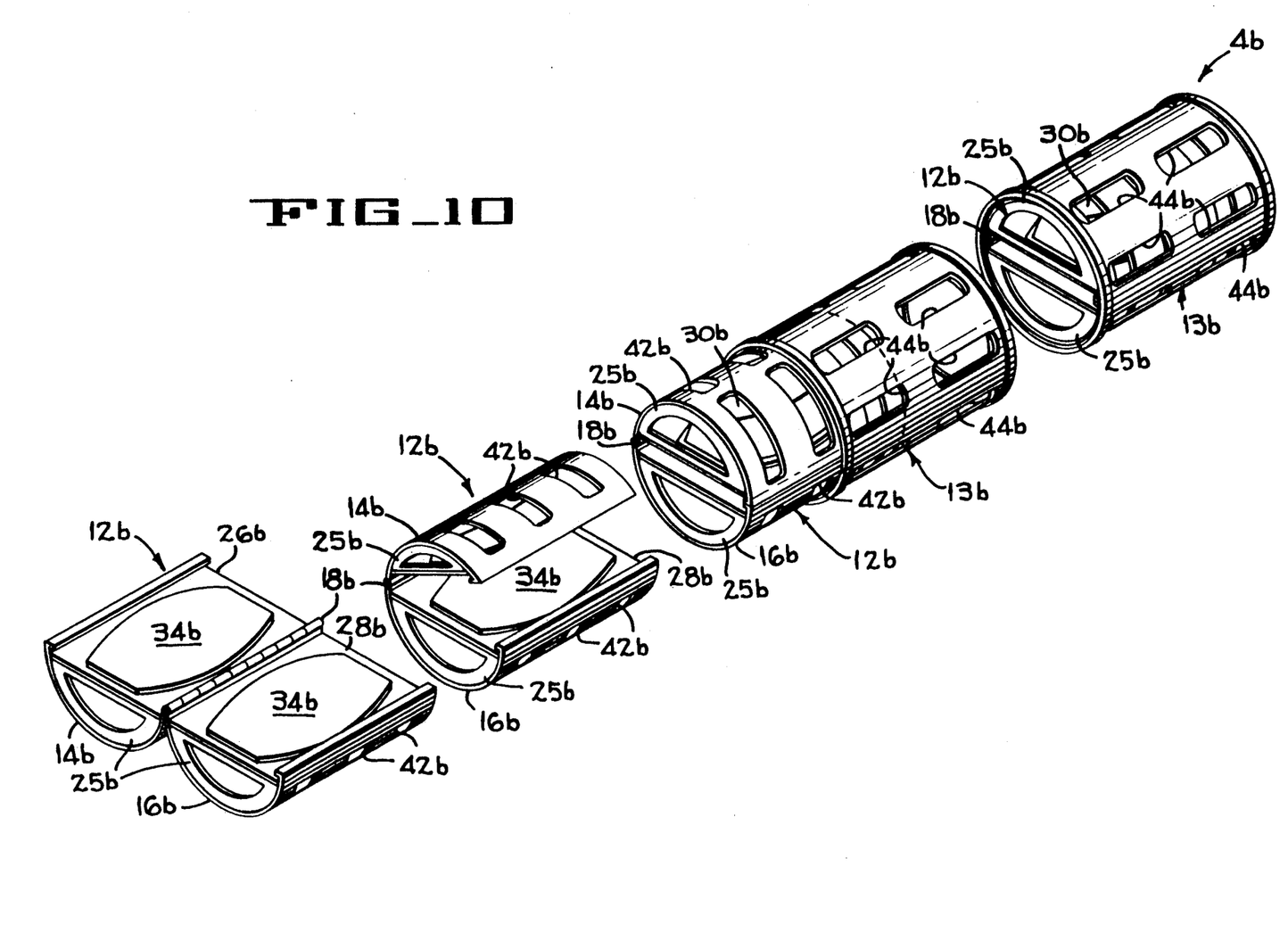
FIG. 10 is an exploded view of the second embodiment of the invention which is similar to the first embodiment but without a spacer therein, and further illustrating progressive steps of loading two containers into the cartridge and thereafter inserting the cartridge into the associated carriers.
Figure 11:
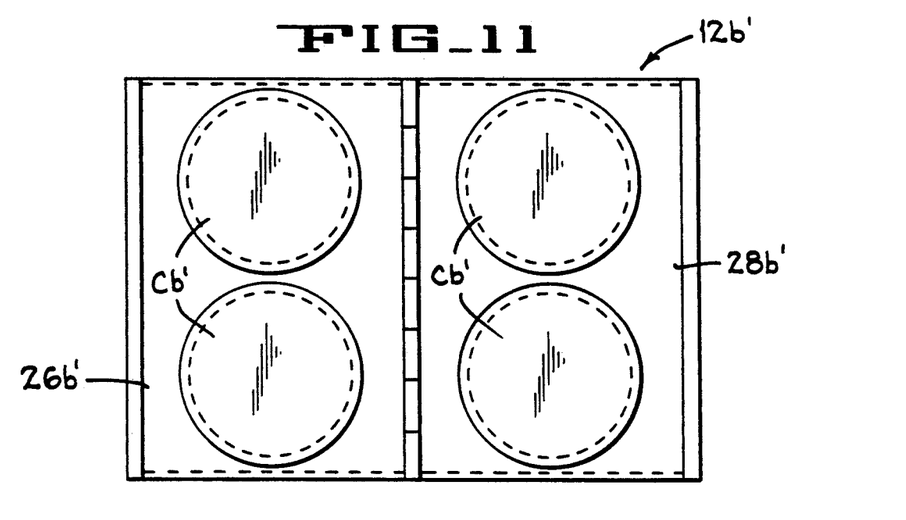
FIG. 11 is a plan view similar to FIG. 7 but of a modified second embodiment of a cartridge of the invention but adapted to support four substantially cylindrical trays rather than two large trays therein.

FIG. 11 illustrates a cartridge 12b' similar to that disclosed in the FIGS. 7-9 embodiments except that a plurality of sealed containers Cb', four containers having circular covers being illustrated, are fitted into four circular openings in the container supporting plates 26b', 28b'. It will be understood, however, that a plurality of more than four containers Cb' may be fitted into additional circular openings in longer plates (not shown), and that the openings in the supporting plates 26b', 28b' may be of different shapes that conform to differently shaped containers being processed.

Figure 12:
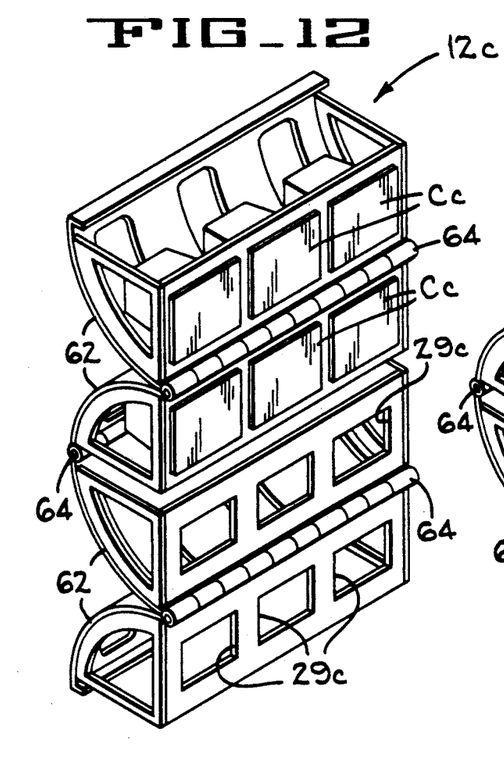
FIG. 12 is a perspective illustrating a third embodiment of a cartridge of the invention showing a multi-segmented cartridge in an open position with two segments having square tapped containers therein.
Figure 13:
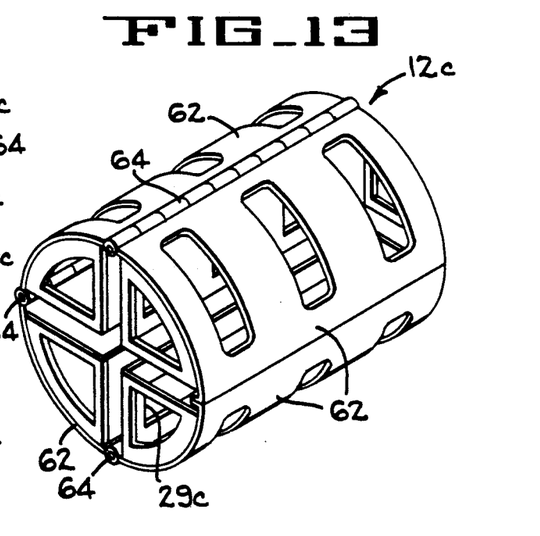
FIG. 13 is a perspective illustrating the FIG. 12 embodiment of the cartridge in a closed position.

FIGS. 12 and 13 illustrate a multi-segmented cartridge 12c of a third embodiment of the invention shown in an open position in FIGS. 12 and a closed position shown in FIG. 13. Four quarter cylindrical segments 62 are pivotally connected together by hinges 64, and each segment has openings 29c (FIG. 12) therein which conforms to the shape of the bodies of the containers Cc being processed. FIG. 12 illustrates two rows of generally rectangular bodied containers Cc loaded into two of the quarter cylindrical segments 62, while the two lower segments are ready to receive other containers Cc. After the four segments 62 are loaded, the four cartridge segments 62 are pivoted about the two or more hinges 64 into a cylindrical shape (FIG. 13) and are moved into a carrier (not shown) but similar to the carriers 13b (FIG. 9) along with the slotted fluid flow openings therein.

Figure 14:
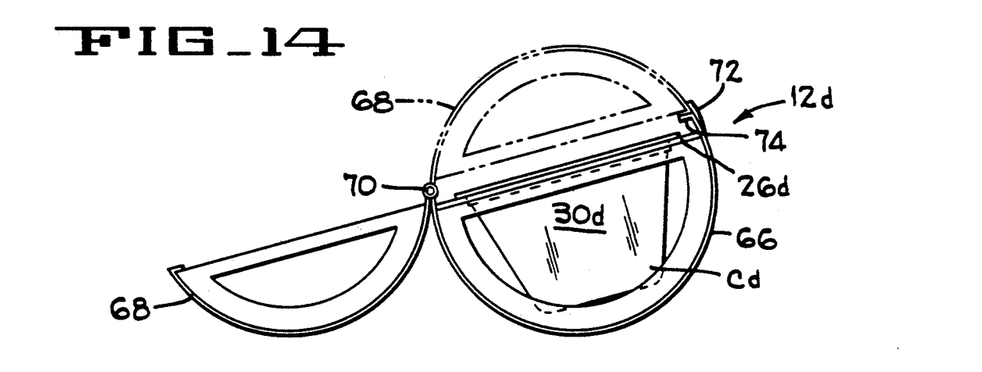
FIG. 14 is an end view of a fourth embodiment of a cartridge shown in solid lines in an open position and in phantom lines in a locked position for handling deep bodied containers and having a snap lock lid.

FIG. 14 illustrates a cartridge 12d of a fourth embodiment of the invention which differs from that of the second embodiment illustrated in FIGS. 7-10 in that the cartridge 12d is formed by a container supporting plate 26d rigidly secured to a first cylindrical segment 66 having an arcuate portion greater than 180 degrees for accommodating a deep bodied container Cd, which container has a body 30d that is deeper than that of the containers in the FIG. 8 embodiment.

A second cylindrical segment defines a cover 68 which extends over an arc of less than 180 degrees. The cover 68 is pivotally connected to the first cylindrical segment by a hinge 70, and the free edges of the cover is provided with a snap lock 72 which is removably latched under a flange 74 of the first cylindrical segment 66.

Figures 15, 15A:
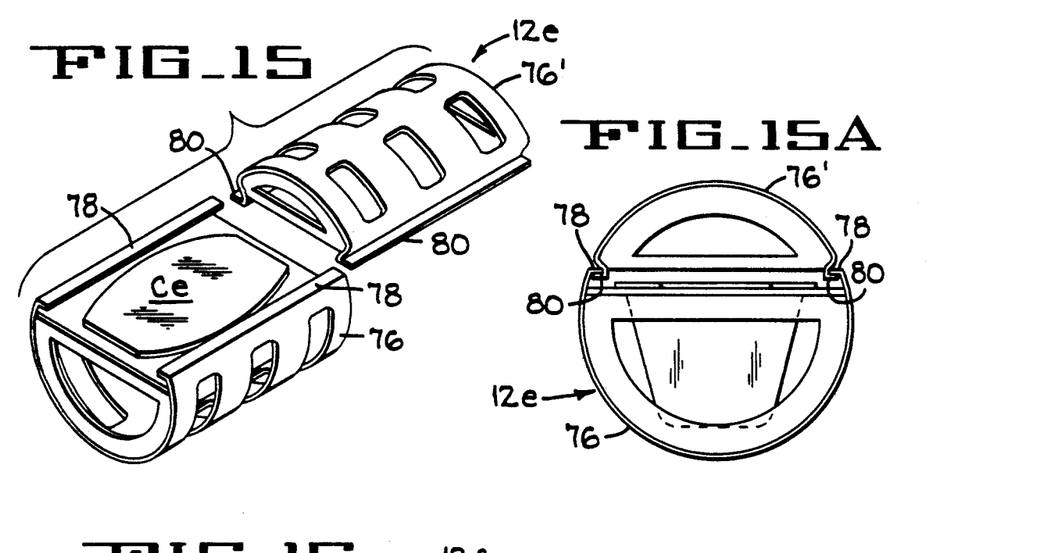
FIG. 15 is a perspective of a modified cartridge of a fifth embodiment similar to the FIG. 14 embodiment of a cartridge for deep bodied containers but illustrating a sliding lid.
FIG. 15A is an end view of FIG. 15 when closed.

FIG. 15 and 15A illustrates a fifth embodiment of the cartridge 12e having a first cylindrical segment 76 greater than 180 degrees and a second cylindrical segment 76' less than 180 degrees; which fifth embodiment is similar to the fourth embodiment except that the hinge is omitted and the first cylindrical segment 76 includes inwardly bent flanges 78 which cooperate with outwardly bent flanges 80 for maintaining a container Ce therein when the cover 76' is slidably received and friction locked to the first cylindrical segment 76. It will be apparent that FIGS. 5-9, 15 and 16 embodiments may be moved through the continuous or orbital rotary sterilization systems without using a carrier.

Figures 16, 17:
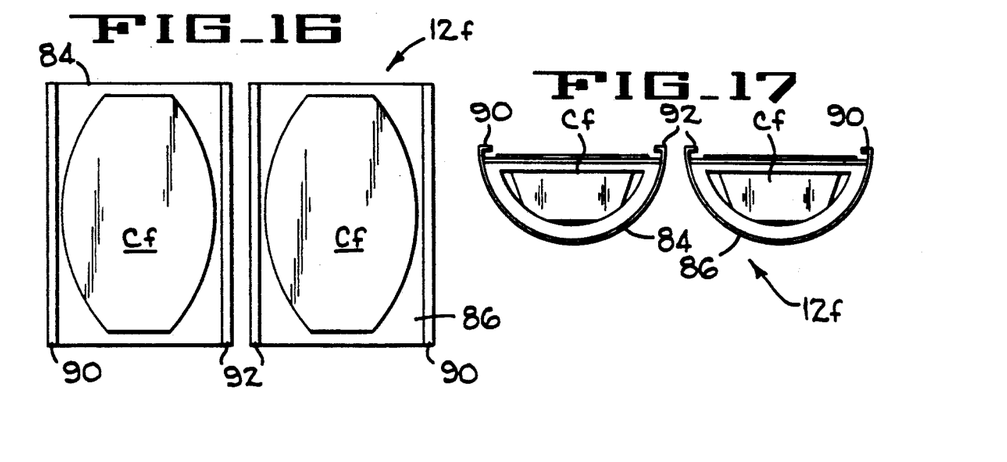
FIG. 16 is a plan view of a sixth embodiment of the invention illustrating a cartridge formed in separate halves.
FIG. 17 is an end elevation of FIG. 15.

FIGS. 16 and 17 illustrate a two piece cartridge 12f of a sixth embodiment of the invention, which embodiment is similar to the second embodiment (FIGS. 7 and 8) but does not include a hinged connection. The two piece cartridge 12f is formed from two cartridge halves 84, 86 having inwardly extending flanges 90, 92 for maintaining the two halves 84, 86 one upon the other as the cartridge halves are being moved within a carrier in a manner similar to that illustrated in FIG. 10.

It will be understood that the cartridges illustrated in FIGS. 11 through 17 all include fluid circulation passages similar to those illustrated in the cartridges 12b of FIGS. 9 and 10; and that the cartridges are moved into carriers similar to carriers 13b of FIGS. 9 and 10 before being moved into prior art continuous or orbital rotary sterilizing systems.

It will also be understood that the diameter and lengths of the cartridges and carriers may vary depending upon the cartridge size for which of the continuous or orbital rotary sterilizing systems are designed.

From the foregoing description it is apparent that the cartridge-carriers of the present invention are capable of supporting plastic containers within a cartridge-carrier which permits the plastic containers to be rotated and sterilized while within a continuous or rotary orbital sterilizing system without damage to the containers and their contents.

Although the best mode contemplated for carrying out the present invention has been herein shown and described, it will be apparent that modification and variation may be made without departing from what is regarded to be the subject matter of the invention.

What is claimed is:

1. A cartridge for encapsulating at least one product filled non-cylindrical container having a body and a large flange sealed by a cover for movement through a reel and spiral sterilization system, comprising:

means defining at least a first and second arcuate segment movable relative to each other which when closed defines an annular partially open ended tube;

means for connecting said at least first and second segments together for movement between an open position for receiving said at least one container and a closed position for encapsulating said at least one container; and means defining at least one container supporting plate in at least one of said segments having at least one container receiving opening therein for encompassing at least one non-cylindrical container body when closed by said cover, said large flange being larger than said body for maintaining said at least one container within said at least one of said first and second segments when in their closed position.

2. A cartridge according to claim 1 and additionally comprising a second container supporting plate secured in the other of said segments and having at least one second container receiving opening therein for encompassing at least one second container body closed by a second container flange and cover, said second container flange and cover being larger than said container body for maintaining said at least one second container with the other of said segments when in said closed position.

3. A cartridge according to claim 2 and additionally comprising a tray spacer pivotally attached to said hinge means and having rectangular outer edges and an internal opening conforming to the shape of a second body container at a location adjacent said flange and cover of said second container, said tray spacer having outer peripheral edges which contact outer peripheral surfaces of the associated covers of said containers when the cartridge is closed for clamping the outer peripheral edges of the covers between the associated support plates and said annular tray spacer.

4. A cartridge according to claim 1 and additionally comprising hinge means for pivotally connecting first adjacent outer peripheral edges of said first and second arcuate segments together, and flanges on second outer edges of said first and second segments that are spaced from said hinge means for assuring that said first and second segments assume an annular shape when closed.

5. An apparatus according to claim 1 wherein said at least one product filled container is a retortable plastic container having a metal lid.

6. An apparatus according to claim 1 wherein said at least one product filled container is a retortable plastic container having a retortable plastic lid.

7. An apparatus according to claim 1 wherein said at least one product filled container is a retortable plastic container having a foil type lid.

8. An apparatus according to claim 1 wherein said cartridge encapsulates a plurality of containers which are at least partially formed by retortable plastic.

9. An apparatus according to claim 3 wherein said tray spacer and said first and second cylindrical segments are notched for enhancing heat transfer between said at least one product filled container.

10. An apparatus according to claim 3 and additional comprising a plurality of notches in said tray spacer which tray spacer contacts the outer surface of the covers while said notches allow heat treatment fluid flow therethrough into contact with the covers of two containers clamped between said tray spacer.

11. An apparatus according to claim 10 and additionally comprising a cylindrical carrier having one end partially closed and the other end open for encompassing said cartridge when telescoped within said cylindrical carrier.

12. An apparatus according to claim 11 wherein said carrier includes a plurality of first elongated openings therein, and wherein said cartridge includes a plurality of second elongated openings therein with said first and second elongated openings having elongated axes at 90° to each other for assuring that said heat treatment fluid adequately flows past the body of each of said containers.

13. An apparatus according to claim 11 and additionally comprising a first cylindrical metal ring rigidly secured around said one end of said cylindrical carrier and a second cylindrical metal ring rigidly secured to said other end of said cylindrical carrier for minimizing wear to said cylindrical carrier.

14. A cartridge for encapsulating at least one product filled non-cylindrical container having a body and a large flange sealed by a cover for movement through a reel and spiral sterilization system, comprising:

means defining first and second closeable segments, which segments are movable relative to each other which includes a pair of inwardly directed flanges which when said segments are closed define a cylindrical tube with complementary ones of said flanges being in contact with each other; and means defining a plate in each of said cylindrical segments each having at least one container receiving opening therein for encapsulating said at least one container body in said plates.

15. A cartridge for encapsulating at least one product filled non-cylindrical container having a container body and a large flange sealed by a container cover for movement through a reel and spiral sterilization system, comprising:

means defining a first and second half-cylinder;

hinge means for pivotally connecting said half-cylinders together for movement between an open position for receiving said at least one container and a closed position for encapsulating said at least one container; and means defining container supporting plates in said first and second half-cylinders each having a container receiving opening therein for encompassing an associated container body when closed by an associated container cover sealed to said large flange of said associated container body which large flange and cover are larger than said associated container body for maintaining at least a portion of said associated container body within an associated one of said first and second half-cylinders when in their closed position, said at least one container body being removably received in said at least one associated container receiving opening and each said container cover being larger than said associated container receiving opening.

16. A cartridge according to claim 15 and additionally comprising a tray spacer pivotally attached to said hinge means and having an annular outer annulus which contacts outer surfaces of the covers of said containers when the cartridge is closed for clamping the peripheries of the covers together between the associated support plates and tray spacer.

17. A cartridge according to claim 16 and additionally comprising flanges on the edges of said first and second half cylinders which are spaced from said hinge means for assuring that said first and second half cylinders assume a cylindrical shape when closed.

18. An apparatus according to claim 15 wherein said at least one product filled non-cylindrical container is a retortable plastic container having a metal lid.

19. An apparatus according to claim 15 wherein said at least one product filled non-cylindrical container is a retortable plastic container having a retortable plastic lid.

* * * * *